Nov. 9, 1965　　　G. G. BOWEN ETAL　　　3,217,120
AUTOMOBILE SIGNAL SWITCH
Filed Dec. 3, 1963
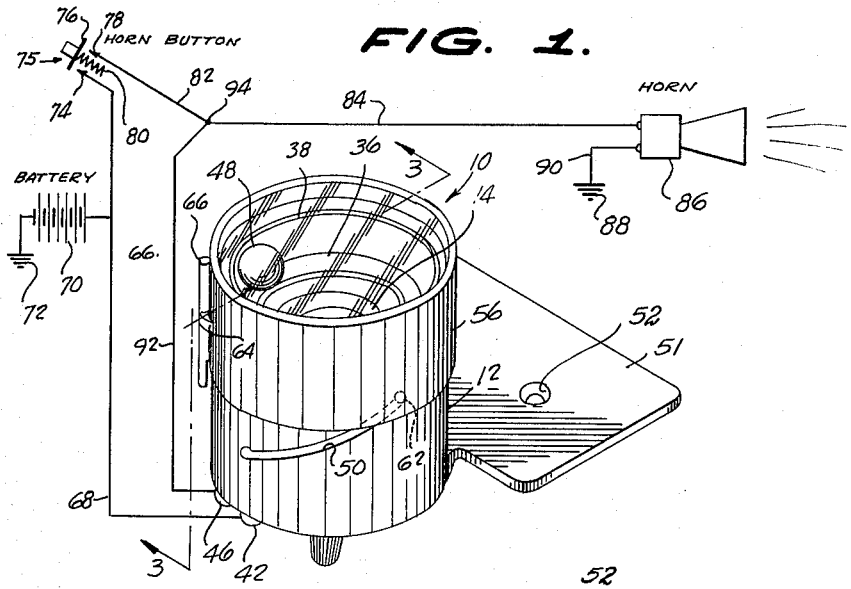
FIG. 1.
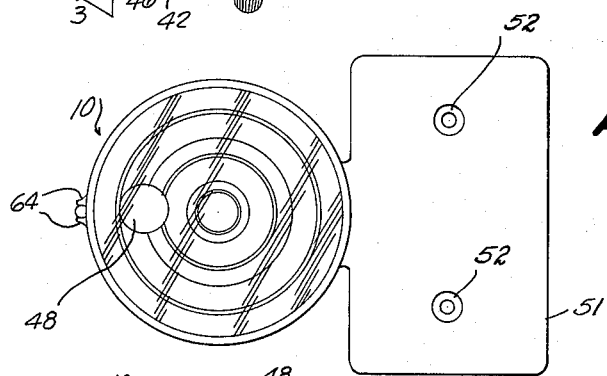
FIG. 2.
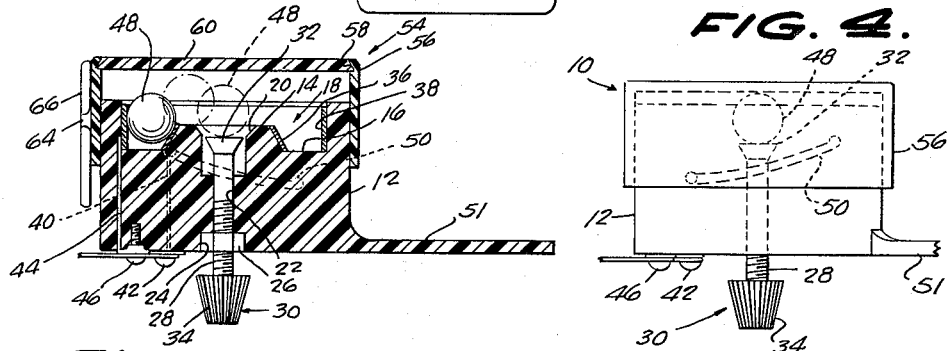
FIG. 3.　　　FIG. 4.
INVENTORS
GEORGE G. BOWEN,
CHARRY L. BOWEN,
BY
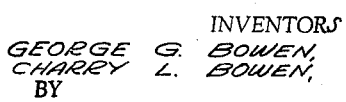
ATTORNEYS.

United States Patent Office 3,217,120
Patented Nov. 9, 1965

3,217,120
AUTOMOBILE SIGNAL SWITCH
George G. Bowen and Charry L. Bowen, both of
461 Hullett St., Long Beach, Calif.
Filed Dec. 3, 1963, Ser. No. 327,704
6 Claims. (Cl. 200—61.52)

This invention relates to the general field of electric circuits and, more specifically, the present invention relates to signal means for automobiles.

It is one of the banes of present-day ownership of automobiles and other similar vehicles to park such vehicles on the street during the course of the day only to find on the following morning that fenders have been smashed or the body of the vehicle otherwise destroyed with no evidence of the person or persons who could be charged with such damage.

Therefore, one of the primary objects of this invention is to provide an audible automobile signal switch which becomes immediately operative upon collision of one vehicle with another.

A further object of this invention is to provide an automobile signal switch wherein a warning device is energized upon the collision of a moving vehicle with a stationary vehicle.

Still another object of this invention is to provide an automobile signal switch which becomes operative upon collision with another vehicle, and which may be rendered inoperative through the use of magnetic means.

Still further, this invention contemplates the use of an automobile signal switch which becomes operative upon collision between vehicles to energize an audible alarm system and wherein the switch may be rendered inoperative during normal driving conditions.

This invention contemplates, as a still further object thereof, the provision of an automobile signal switch for use in audible signal systems or in optical signal systems, the switch being capable of being rendered inoperative during normal automotive vehicle operation and operative at such times as the vehicle is stationary or parked on the street or in a garage.

This invention has, as a still further object thereof, the provision of an audible signal system rendered operative upon collision of a parked vehicle, and magnetic means for effecting de-energization of the signal system.

As a still further object of this invention, it is proposed to provide an automotive vehicle signal system which becomes operative upon collision of two or more vehicles, the signal system being non-complex in construction and assembly, inexpensive to manufacture and maintain, and which is durable in use.

Other and further objects and advantages of the instant invention will become more manifest from a consideration of the following specification when read in conjunction with the annexed drawing, in which:

FIGURE 1 is a perspective view of an impact-actuated automobile signal switch including a schematic wiring diagram for energizing an audible device;

FIGURE 2 is a top plan view of the signal switch shown in FIGURE 1;

FIGURE 3 is a detail cross-sectional view, FIGURE 3 being taken substantially on the vertical plane of line 3—3 of FIGURE 1, looking in the direction of the arrows, FIGURE 3 showing the device in its operative position; and FIGURE 4 is a side elevational view of the automobile signal switch in its inoperative position.

Referring now more specifically to the single sheet of drawings, reference numeral 10 indicates, in general, an automobile signal switch constructed in accordance with the teachings of this invention. As is shown in the several figures of the drawing, the automobile signal switch 10 comprises a cylindrical main body portion 12 preferably formed of a nonconducting electrically-insulating material, which may be readily formed from a dielectric plastic. The main body portion 12 is seen to include a recessed frusto-conical centrally-located section 14 which opens at its base into a circumferential groove 16.

The frusto-conical section 14 is provided with a normally vertically-extending bore forming a cylindrical chamber 18 which communicates, at its upper end, with a countersunk opening 20. The chamber 18, at its lower end, is in open communication with a bore 22 which extends transversely through the main body portion 12. The other or lower end of the passage 22 is countersunk, as at 24, in order to receive a nut 26 which may be molded with the main body portion 12, or otherwise secured thereon.

Threaded within the nut 26 is the threaded stem 28 of a screw generally designated by reference numeral 30. The screw 30 terminates at its upper end in an inverted frusto-conical support member 32 normally disposed within the chamber 18, and at its other end in an inverted frusto-conical knob 34 which normally projects below the main body portion 12, reference being made to FIGURES 1, 3 and 4.

The knob 34 is adapted for manual manipulation to serve a function to be described.

Disposed within the groove 16 and fixedly connected to the exterior side of the central frusto-conical section 14 is a continuous peripheral belt 36 formed of any desirable electrically-conductive material, preferably a conductive metal. Since the belt 36 complements the exterior configuration of the frusto-conical central section 14 it, too, must assume the same configuration.

Also disposed within the groove 16 and aligning the wall thereof is a continuous substantially cylindrical band 38 also formed of an electrically-conductive material, preferably one of metal. As is seen in the drawing, the peripheral belt 36 and the cylindrical band 38, while being disposed in the groove 16, are spaced from one another, but are concentric with respect to each other.

Embedded within the main body portion 12 is a wire 40 having one of its ends connected with the belt 36, and the other end thereof is connected to a binding post 42. A second wire 44 is also embedded within the main body portion 12 and has one of its ends connected with the band 38, and the other end of the wire 44 is connected with a second binding post 46. As is seen in FIGURE 3 of the drawing, both binding posts 42, 46 are threaded into the lower end of the main body portion 12.

A switch arm of a steel ball type is indicated at 48, the switch arm having a diameter sufficiently great as to span the distance between the belt 36 and band 38 and to engage thereagainst under conditions to be described, and to serve a function to which further reference will be made.

The full-line position of the steel ball 48, shown in FIGURES 1, 2 and 3, designates its position in closing an electrical circuit to be described, whereas the dotted-line position of the steel ball 48, as shown in FIGURES 3 and 4, shows the same in its inoperative or non-circuit closing position.

The exterior side of the main body portion 12 is provided with an ascending cam groove 50 (see FIGURES 1, 3 and 4) to serve a function to be described, and the main body portion 12 is also formed with an exterior laterally-projecting, substantially rectangular mounting flange 51. The flange 51 is formed with a pair of countersunk openings 52 to receive screws (not shown) to mount the switch on an automobile or other similar type vehicle with the longitudinal axis of the main body portion 12 being disposed in a vertical plane.

Indicated, in general, by reference numeral 54 is a closure member for the upper end of the main body portion 12. The closure member 54 is seen to include a cylindrical sidewall 56 adapted for sliding contact with the exterior side of the main body portion 12. The cylindrical sidewall 56 is rabbeted, as at 58, in order to accept a substantially cylindrical transparent disc 60 of plastic material.

To serve a function to be described, the cylindrical sidewall 56 is formed with an inwardly-extending cam follower 62 which is adapted to ride within the cam groove 50. Also formed integral with, preferably, the cylindrical sidewall 56 is a pair of outwardly-flaring resilient and confronting clamp arms 64 which are adapted to receive therebetween an elongated substantially cylindrical magnetic rod 66. As is seen in the drawing, the rod 66 extends axially of the main body portion 12 and of the cylindrical sidewall 56.

Referring now more specifically to FIGURE 1 of the drawing, it is seen that the binding post 42 connects through wire 68 with one side of a battery 70, or other source of E.M.F. The other side of the battery 70 is grounded, as at 72. The wire 68 also extends and is connected with a fixed switch contact 74 of a conventional horn button or switch 75. The horn button or switch 75 includes a movable switch arm 76 which is adapted to span and engage the fixed switch contact 74 and a second fixed switch contact 78. Diagrammatically illustrated at 80 is a resilient means, such as a helicoidal spring which constantly biases the switch arm 76 out of movement and contact with the fixed switch contacts 74, 78.

The fixed switch contact 78 connects through wires 82, 84 with one side of a conventional automobile horn, the other side of the horn being grounded at 88 through wire 90. It should now be obvious that the closing of the switch arm 76 against the fixed switch contacts 74, 78 will establish an electrical circuit through the horn 86 to sound an alarm in the conventional manner.

Reference numeral 92 designates a wire which leads from the binding post 46 to a junction at 94 with the wires 82, 84.

The automatic signal device described above is designed in such manner that the same may be secured to any convenient support on the vehicle through the use of the flange 51 in such manner that the longitudinal axis of the main body portion 12 is substantially vertical. With this being established, the steel ball 48 is transferred from its full-line position shown in FIGURES 1, 2 and 3, to its dotted-line position shown in FIGURES 3 and 4, wherein the steel ball 48 rests upon the inverted frusto-conical support member 32 with a portion of the ball being disposed within the countersunk opening 20. As is shown in FIGURES 1 and 3, the cam follower 62 of the closure member 54 is disposed on the high side of the cam groove 50, and the transparent cylindrical disc 60 is, therefore, maintained in elevated position above the apex of the steel ball 48. With the switch 10 installed in the manner described, and with the ball 48 disposed in its dotted-line position as shown in FIGURES 3 and 4, the utility of the switch should be apparent. However, and for explanatory purposes, let it be assumed that the vehicle on which the switch 10 is fixed is parked in a garage or on a street. Let it further be assumed that the vehicle on which the switch 10 is mounted is rammed or side-swiped by a second vehicle. The impact between the two vehicles will normally exert a sufficient force to cause the steel ball 48 to ride off the inverted frusto-conical support member 32, and up the countersunk portion 20 of the central frusto-conical section 14 to come to rest, at chance, anywhere along the belt 36 and band 38. This will immediately establish a circuit reading from the ground 72 to one side of the battery 70, and then through wire 68, binding post 42, wire 40, belt 36, steel ball 48, wire 44, binding post 46, wires 92, 84 to one side of the horn 86, the other side of the horn 86 being ground at 88 through wire 90. The horn 86, now being energized, sounds an audible alarm. With the sounding of the alarm, the owner of the parked vehicle upon which the switch 10 is mounted will have his attention drawn thereto, or the attention of any of the passing public will be drawn to the collided vehicles.

To open the circuit to the horn 86 it is only necessary for the owner to detach the magnetic rod 66 from the clamp arms 64 and to draw the same across the transparent cylindrical disc 60 to cause the steel ball or switch arm 48 to move from the full-line position shown in FIGURE 3 to its dotted-line position shown in FIGURES 3 and 4, so that it once again becomes supported on the frusto-conical support member 32.

It is obvious, of course, that conventional driving which includes the usual stops and starts would, through inertia, cause the steel ball 48 to move from its dotted-line position shown in FIGURE 3 to its full-line position, and thereby, inadvertently close the circuit to the horn 86. To preclude this inadvertent and unwanted signal, the cylinder sidewall 56 is twisted in a clockwise direction, reference being made to FIGURES 1 and 2, so that the cam follower or lug 62 will trace the groove 50 in descent. This, of course, causes the transparent cylindrical disc 60 to move downwardly and engage against the apex end of the steel ball 48 to firmly lock the same on the inverted frusto-conical support member 32.

To place the switch 10 in immediate condition for operation it is only necessary that the cylindrical sidewall 56 be turned counterclockwise, reference again being made to FIGURE 1 of the drawing, so that the cam follower 62 rides upwardly in the slot or groove 50, raising the cylindrical disc 60 above the apex end of the steel ball 48. The screw 30 is, of course, adjusted vertically so that the steel ball 48 may ride easily out of the countersunk opening 20 over the top of the frusto-conical central section 14 to lodge between the belt 36 and the band 38 upon impact.

Having thus described and illustrated one embodiment of this invention, it will be understood that the same is offered merely by way of example, and that this invention is to be limited only by the scope of the appended claims.

What is claimed is:

1. An automobile signal switch for controlling a signal circuit comprising a substantially cylindrical main body portion, a mounting flange projecting radially from said main body portion substantially perpendicular to the longitudinal axis of said main body portion, means cooperating with said flange to mount said main body portion on said vehicle with the longitudinal axis of said main body portion disposed in a vertical plane, said main body portion having a centrally-located frusto-conical section and a continuous circumferential groove surrounding said frusto-conical section, said main body portion and said frusto-conical section being formed of an electrically-nonconductive material, a belt surrounding said frusto-conical section, said belt being formed of an electrically-conductive material, a substantially continuous band disposed within said groove and secured to the inner wall thereof, said band being formed of electrically-conductive material, said main body portion and said frusto-conical section having a passage extending therethrough coaxially therewith, support means disposed within said passage and opening into the upper end of said frusto-conical section, said support means including an elongated screw threaded in said passage and having an upper end opening out of the upper end of said frust-conical section, a ball formed of electrically-conductive material, means for connecting said belt and band in a normally open electrical signal circuit, said circuit being closed upon impact imparted to said vehicle whereby said ball is displaced from said support means to span and engage across said belt and said band to close said series circuit to said signal, and means for holding said switch in its normally open position, said last-named means comprising a substantially cylindrical sidewall telescoped over said main body portion, and a substantially cylindrical transparent disc extending across the upper end of said sidewall, said sidewall and said disc being adapted for displacement toward said ball to engage said ball and retain the same on said screw during the normal operation of said vehicle.

2. A switch as defined in claim 1, wherein the exterior side of said main body portion is provided with a groove which descends from an upper end to a lower end, and means on said sidewall to track said groove as said sidewall is turned in clockwise or counterclockwise directions whereby said transparent cylindrical disc is moved into and out of engagement with said ball as the same remains seated on its said support means.

3. A switch as defined in claim 2, and means operable to open said series circuit after said ball has been displaced from its said support means.

4. A switch as defined in claim 3, wherein said means for opening said circuit comprise magnetic means.

5. A switch as defined in claim 4, wherein said ball is formed of a ferrous material and said magnetic means comprises a permanent magnet.

6. A switch as defined in claim 5, and means on said cylindrical sidewall for detachably connecting said permanent magnet thereto.

References Cited by the Examiner

UNITED STATES PATENTS 2,365,262   12/44   Gair _____ 200—61

FOREIGN PATENTS 609,839   5/26   France.
376,918   6/23   Germany.
287,780   3/28   Great Britain.

BERNARD A. GILHEANY, *Primary Examiner.*